United States Patent
Hatakeyama

(10) Patent No.: US 8,605,163 B2
(45) Date of Patent: Dec. 10, 2013

(54) IMAGE PROCESSING METHOD, IMAGE PROCESSING APPARATUS, IMAGE PICKUP APPARATUS, AND STORAGE MEDIUM CAPABLE OF SUPPRESSING GENERATION OF FALSE COLOR CAUSED BY IMAGE RESTORATION

(75) Inventor: Koshi Hatakeyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 913 days.

(21) Appl. No.: 12/568,576

(22) Filed: Sep. 28, 2009

(65) Prior Publication Data

US 2010/0079615 A1 Apr. 1, 2010

(30) Foreign Application Priority Data

Sep. 30, 2008 (JP) ................................ 2008-252322

(51) Int. Cl.
*H04N 5/225* (2006.01)
(52) U.S. Cl.
USPC ........................................ 348/222.1; 348/273
(58) Field of Classification Search
USPC ................. 348/335, 251, 222.1, 273; 359/16; 382/254, 260, 273, 276, 280
See application file for complete search history.

(56) References Cited

U.S. PATENT DOCUMENTS

| | | | |
|---|---|---|---|
| 5,879,284 A | 3/1999 | Tsujita | |
| 6,697,522 B1 * | 2/2004 | Ishikawa | 382/167 |
| 2001/0008418 A1 * | 7/2001 | Yamanaka et al. | 348/222 |
| 2005/0069218 A1 * | 3/2005 | Chen | 382/274 |
| 2006/0239549 A1 * | 10/2006 | Kelly et al. | 382/167 |
| 2007/0116375 A1 * | 5/2007 | Utsugi et al. | 382/264 |
| 2007/0126892 A1 * | 6/2007 | Guan | 348/240.99 |
| 2009/0219419 A1 * | 9/2009 | Kawasaka | 348/251 |
| 2010/0220203 A1 * | 9/2010 | Takahashi | 348/222.1 |

FOREIGN PATENT DOCUMENTS

| | | | | |
|---|---|---|---|---|
| JP | H10-165365 A | 6/1998 | | |
| JP | 2000186979 A | 7/2000 | | |
| JP | 2001197356 A | 7/2001 | | |
| WO | WO 9967743 A1 * | 12/1999 | | G06T 3/00 |
| WO | 2005101854 A | 10/2005 | | |

* cited by examiner

*Primary Examiner* — Nelson D. Hernández Hernández
(74) *Attorney, Agent, or Firm* — Canon U.S.A., Inc. IP Division

(57) ABSTRACT

An image processing method comprises obtaining a color input image obtained by taking an image using an optical system 101, calculating an amount of characteristics relating to a color of a pixel in the input image as a first calculating step (S4), performing an image restoration process for the input image using an image restoration filter selected or made based on aberration information of the optical system (S5), calculating an amount of characteristics relating to a color of a pixel of a restored image obtained by the image restoration process as a second calculating step (S6), and correcting a signal value of a specific pixel in the restored image in accordance with the amount of characteristics of the specific pixel in the restored image calculated by the second calculating step and the amount of characteristics of a specific pixel of the input image calculated by the first calculating step (S8).

22 Claims, 10 Drawing Sheets

IMAGE PROCESSING METHOD, IMAGE PROCESSING APPARATUS, IMAGE PICKUP APPARATUS, AND STORAGE MEDIUM CAPABLE OF SUPPRESSING GENERATION OF FALSE COLOR CAUSED BY IMAGE RESTORATION

BACKGROUND OF THE INVENTION

1. Field of the Invention

The present invention relates to an image processing technology which reduces a blur component contained in an image by an image restoration process.

2. Description of the Related Art

An image obtained by imaging an object using an image pickup apparatus such as a digital camera contains a blur component as an image deteriorating component which is caused by a spherical aberration, comatic aberration, a field curvature, or astigmatism of an image pickup optical system (hereinafter, referred to simply as an "optical system"), or the like. Such a blur component is generated by forming an image with a certain spread although a light beam emitted from one point of an object is ideally focused on one point on an imaging plane again if there is no influence of diffraction without any aberrations.

The blur component is optically represented by a point spread function (PSF), and is different from a blur caused by the defocusing. A color image may run due to a difference of the way of the blur for each light wavelength if it is caused by an on-axis chromatic aberration, a spherical aberration of a color, or a comatic aberration of a color.

As a method for correcting a blur component of an image, a correction method using information of an optical transfer function (OTF) of an optical system has been known. The method is called an image restoration or an image recovery, and hereinafter a process of correcting (reducing) the blur component of an image using the information of the optical transfer function (OTF) of the optical system is referred to as an image restoration process.

A summary of the image restoration process is as follows. A deteriorated image containing a blur component (input image) is defined as g(x,y), and an original image, which is not deteriorated, is defined as f(x,y). A point spread function (PSF) that is a Fourier pair of the optical transfer function is defined as h(x,y). In this case, the following expression is satisfied. In the expression, symbol * denotes a convolution, and symbol (x,y) denotes a coordinate on an image.

$$g(x,y)=h(x,y)*f(x,y)$$

When the above expression is converted into a display format on a two-dimensional frequency plane by a Fourier transform, as described in the following expression, it is changed to a format of product for each frequency. Symbol H denotes a value which is obtained by performing the Fourier transform of the point spread function (PSF), and it is the optical transfer function (OTF). Symbol (u,v) denotes a coordinate on the two-dimensional frequency plane, i.e. frequency.

$$G(u,v)=H(u,v)\cdot F(u,v)$$

In order to obtain the original image from the deteriorated image, as described below, both sides are divided by H.

$$G(u,v)/H(u,v)=F(u,v)$$

When an inverse Fourier transform is performed for F(u,v) to return it to a real plane, a restored image corresponding to the original image f(x,y) can be obtained.

When symbol R is defined as a value obtained by performing the inverse Fourier transform of $H^{-1}$, similarly, the original image can be obtained by performing a convolution process for the image on the real plane as the following expression.

$$g(x,y)*R(x,y)=f(x,y)$$

R(x,y) is referred to as an image restoration filter. An actual image contains a noise component. Therefore, when the image restoration filter made by using a complete inverse of the optical transfer function (OTF) as described above is used, the noise component is amplified along with the deteriorated image and generally a good image can not be obtained. In this regard, for example, a method of suppressing a restoration rate at a high frequency side of an image in accordance with intensity rate of an image signal and a noise signal, like a Wiener filter, has been known. The deterioration of the color running component of an image, for example completes to be corrected if a blur for each color component of the image is uniform by the correction of the blur component described above.

Because the optical transfer function (OTF) varies in accordance with a state of the optical system such as a focal distance (zoom state) of the optical system or a stop diameter, the image restoration filter used for the image restoration process also needs to be changed in accordance with the state of the optical system.

Japanese Patent No. 3532368 discloses an endoscope for observing inside a biological object. The endoscope eliminates a blur of an image using a PSF in accordance with a used fluorescence wavelength in a range beyond an in-focus range of an image pickup system. In other words, an objective optical system with a small F-number is necessary because the fluorescence is weak, and an in-focus image is obtained by performing an image restoration process for a range of out of focus because a focal depth is shallow.

As described above, the image restoration process is performed for the input image obtained by taking an image to be able to obtain a restored image of a high quality image in which a blur component has been corrected in accordance with various aberrations of the optical system.

However, in taking an actual image, there may be a possibility that a state of the optical system in obtaining an input image and a state of the optical system corresponding to the image restoration filter which is applied to the input image do not match each other. For example, a case where a three-dimensional object is imaged is considered.

An image pickup apparatus takes an image focusing a focal point on one plane in an object space by an autofocus function or a manual focusing. However, when the object is a three-dimensional object, an object distance is different in accordance with a field angle. In this case, although a part which is in-focus state in the object can be comparatively sharply imaged, a part of out-of-focus state is imaged with a blur in accordance with the distance. When information relating to the object distance obtained in taking an image is only information of an object distance to the in-focus part, the image restoration filter which is optimized for each field angle at the object distance is used.

Therefore, in the image after the image restoration process, because an image restoration filter which is optimized for the in-focus part is applied, a desired sharpness can be obtained in the in-focus part. However, an image restoration filter which is not optimized for the out-of-focus part is applied. Therefore, a blur component remains in the out-of-focus part although a restoration effect is somewhat obtained.

On the other hand, in some cases, the blur in accordance with the object distance is effective for representing a three dimensional appearance in an image or an extracted appearance of a watched object. For example, there is a representing method of intentionally blurring a background by being focused on a main object using a telephoto lens with a shallow depth of field. In this case, even for the image after the image restoration process, it is preferable that the in-focus part (hereinafter, referred to also as an "in-focus object") is further sharpened and the blur remains in the out-of-focus part (hereinafter, referred to also as an "out-of-focus object").

However, the inventor has discovered that there is a possibility that a false color may be generated in principle when an image restoration process is performed for the out-of-focus object using an image restoration filter, which is optimized for an in-focus distance but is not optimized for an out-of-focus distance. The false color is, for example generated by increasing the color by the image restoration process when the color is generated in an edge portion of the out-of-focus object in accordance with a chromatic aberration included in the optical system.

Further, in some cases, such a false color may be generated without being limited to taking an image of a three-dimensional object. In other words, the false color is generated when a state of an aberration changed in accordance with the optical system at the time of taking an image and a state of an aberration to which the image restoration filter corresponds are different from each other, whether it is in-focus state or out-of-focus state inherently.

In the image restoration process for improving an image quality, the generation of the false color causes a significant deterioration of the image quality.

Japanese Patent No. 3532368 discloses that a technology for performing an image restoration process for an out-of-focus range to increase a sharpness to improve an image quality. However, because a false color is generated even if the sharpness increases, the image quality in totality can not be improved.

BRIEF SUMMARY OF THE INVENTION

The present invention provides an image processing method, an image processing apparatus, and an image pickup apparatus, which are capable of suppressing the generation of a false color caused by an image restoration process.

An image processing method as one aspect of the present invention includes the steps of obtaining a color input image obtained by taking an image using an optical system, calculating an amount of characteristics relating to a color of a pixel in the input image as a first calculating step, performing an image restoration process for the input image using an image restoration filter selected or made based on aberration information of the optical system, calculating an amount of characteristics relating to a color of a pixel of a restored image obtained by the image restoration process as a second calculating step, and correcting a signal value of a specific pixel in the restored image in accordance with the amount of characteristics of the specific pixel in the restored image calculated by the second calculating step and the amount of characteristics of a specific pixel of the input image calculated by the first calculating step.

An image processing apparatus as another aspect of the present invention is an image processing apparatus which processes a color input image obtained by taking an image using an optical system. The image processing apparatus includes a first calculating device configured to calculate an amount of characteristics relating to a color of a pixel in the input image, a storage device configured to store an image restoration filter selected or made based on aberration information of the optical system, an image restoration device configured to perform an image restoration process for the input image using the image restoration filter, a second calculating device configured to calculate an amount of characteristics relating to a color of a pixel of a restored image obtained by the image restoration process, and a correcting device configured to correct a signal value of a specific pixel in the restored image in accordance with the amount of characteristics of the specific pixel in the restored image calculated by the second calculating device and the amount of characteristics of a specific pixel of the input image calculated by the first calculating device.

An image pickup apparatus as another aspect of the present invention includes an image pickup system configured to perform a photoelectric conversion of an object image formed by an optical system to generate a color input image, and the above image processing apparatus configured to process the input image.

A storage medium as another aspect of the present invention is a storage medium which stores a program for executing the above image processing method.

Further features and aspects of the present invention will become apparent from the following description of exemplary embodiments with reference to the attached drawings.

DETAILED DESCRIPTION OF THE PREFERRED EMBODIMENTS

Exemplary embodiments of the present invention will be described below with reference to the accompanied drawings.

Embodiment 1

In the present embodiment, each pixel of a color input image obtained by taking an image contains a signal value for each color component of R, G, or B. As an amount of characteristics relating to a color of a pixel, a ratio of signal values between R, G, and B (brightness ratio) is defined as a color difference. Generally, the color difference is, for example, used as a value ΔE calculated from the following definition expression in an L*a*b* color space. In the embodiment, it is defined as a ratio of mutual signal values between R, G, and B.

$$\Delta E = [(\Delta L^*)^2 + (\Delta a^*)^2 + (\Delta b^*)^2]^{1/2}$$

The color difference in the embodiment is not limited to the ratio of the signal values described above, but a difference of mutual signal values between R, G, and B under certain conditions may also be adopted.

Figure 1:
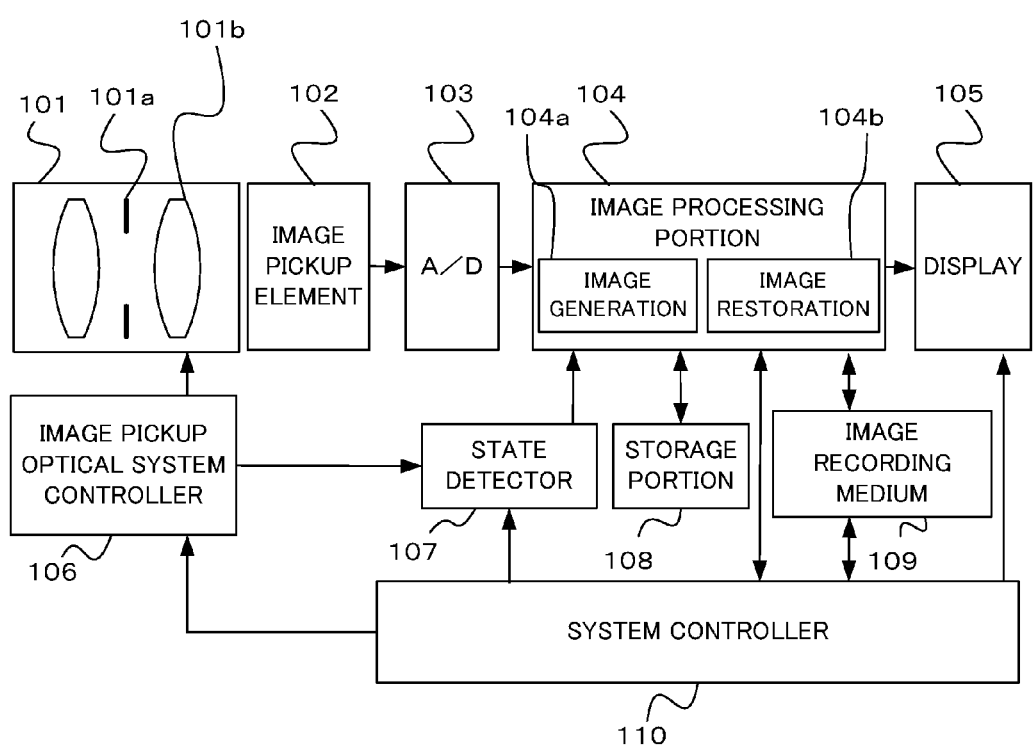
FIG. 1 is a block diagram showing a configuration of an image pickup apparatus that is Embodiment 1 of the present invention.

FIG. 1 shows a configuration of an image pickup apparatus such as a digital camera or a video camera which includes an image processing apparatus that is Embodiment 1 of the present invention, i.e. which uses an image processing method.

A light beam from an object (not shown) forms an image on an image pickup element 102 including a CCD sensor, a CMOS sensor, or the like, by an image pickup optical system 101.

The image pickup optical system 101 includes a variable magnification lens (not shown), a stop 101a, and a focus lens 101b. The variable magnification lens is moved in an optical axis direction to be able to zoom for changing a focal distance of the image pickup optical system 101. The stop 101a increases and decreases a stop opening diameter to adjust a light intensity reaching the image pickup element 102. In order to perform a focusing in accordance with an object distance, an auto focus (AF) mechanism or a manual focus mechanism (not shown) controls a position of the focus lens 101b in the optical axis direction.

An object image formed on the image pickup element 102 is converted into an electric signal by the image pickup element 102. An analog output signal from the image pickup element 102 is converted into a digital image pickup signal by an A/D converter 103 to be inputted to an image processing portion 104.

The image processing portion 104 includes an image generating portion 104a which performs a wide variety of processes for the inputted digital image pickup signal to generate a color input image. The image processing portion 104 includes an image restoration processing portion 104b which performs an image restoration process for the input image. Components from the image pickup element 102 to the image generating portion 104a correspond to an image pickup system. The image restoration processing portion 104b functions as a first calculating device, an image restoration device, a second calculating device, and a correcting device.

In the present embodiment, a case where one pixel of an input image includes signal values of three color components of R, G, and B will be described.

The image restoration processing portion 104b obtains information of a state of the image pickup optical system 101 (hereinafter, referred to as an "image pickup state") from a state detector 107. The image pickup state means that for example a focal distance (zoom position) of the image pickup optical system 101, a stop opening diameter (stop value, F-number), and focus lens position (object distance). The state detector 107 may obtain the information of the image pickup state from a system controller 110 or from an image pickup optical system controller 106 which controls the image pickup optical system 101.

The image restoration processing portion 104b selects an image restoration filter in accordance with the image pickup state from a storage portion (storage device) 108 to perform an image restoration process for the input image. The state detector 107, the image restoration processing portion 104b, and the storage portion 108 constitute an image processing apparatus in an image pickup apparatus.

Figure 2:
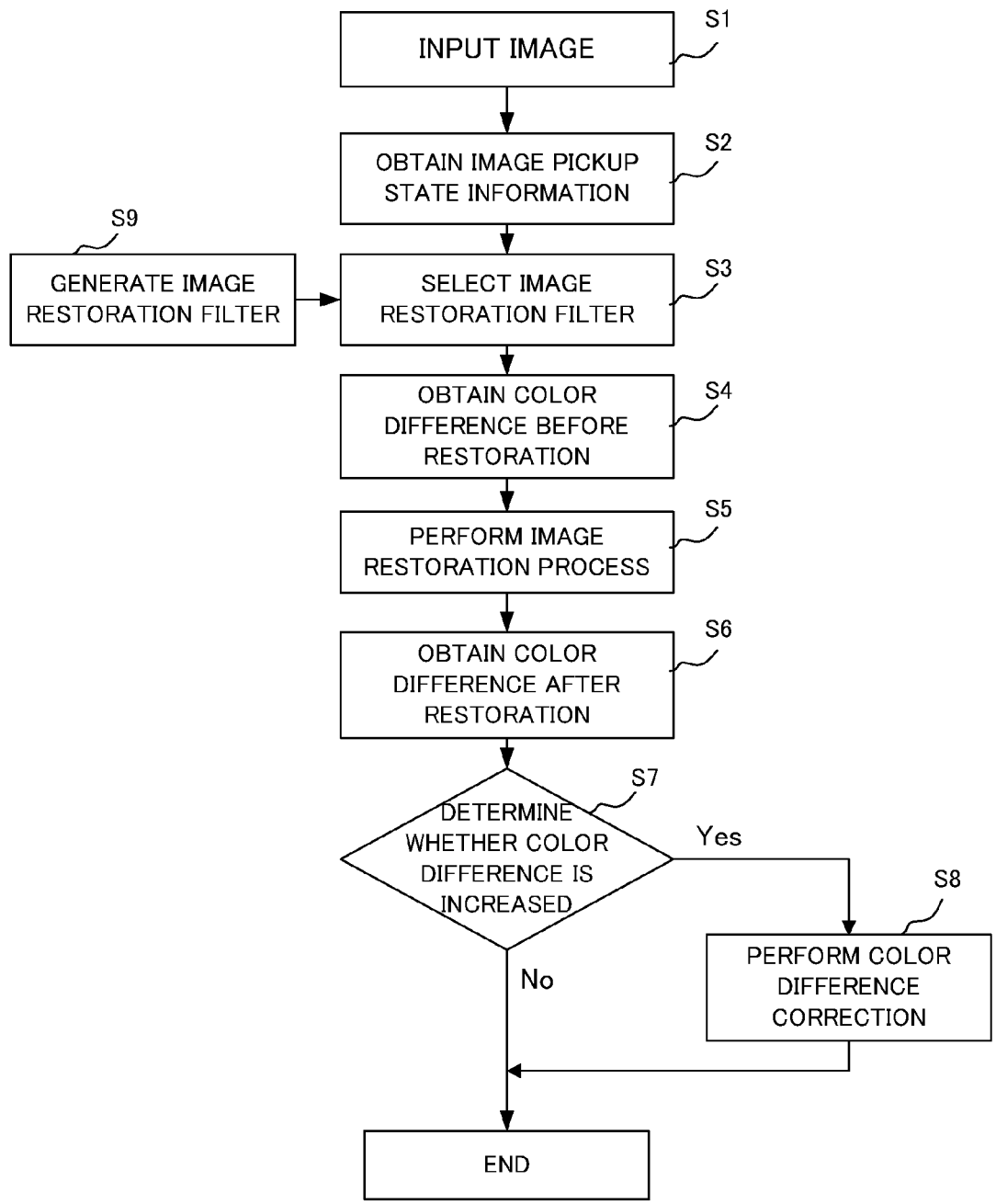
FIG. 2 is a flowchart showing a process which is performed by an image pickup apparatus of Embodiment 1.

FIG. 2 shows a flowchart of a process relating to an image restoration (image processing method) which is performed by the image restoration processing portion 104b (hereinafter, referred to as an "image processing portion 104"). The image processing portion 104 is constituted by an image processing computer and performs the process in accordance with a computer program.

In Step S1, the image processing portion 104 obtains an input image generated based on an output signal from the image pickup element 102 as an object of the image restoration process. Subsequently, in Step S2, the image processing portion 104 obtains image pickup state information from the state detector 107.

Next, in Step S3, the image processing portion 104 selects an image restoration filter corresponding to the image pickup state from the storage portion 108. In this case, the selected image restoration filter may be corrected if necessary. In other words, in order to reduce the number of image restoration filters (the number of data) stored in the storage portion 108, only image restoration filters for the image pickup state, which are discretely selected, are prepared. Then, an image restoration filter which is close to the image pickup state is selected, and a correction is performed so as to optimize it to an actual image pickup state to make an image restoration filter which is actually to be used.

Figure 4:
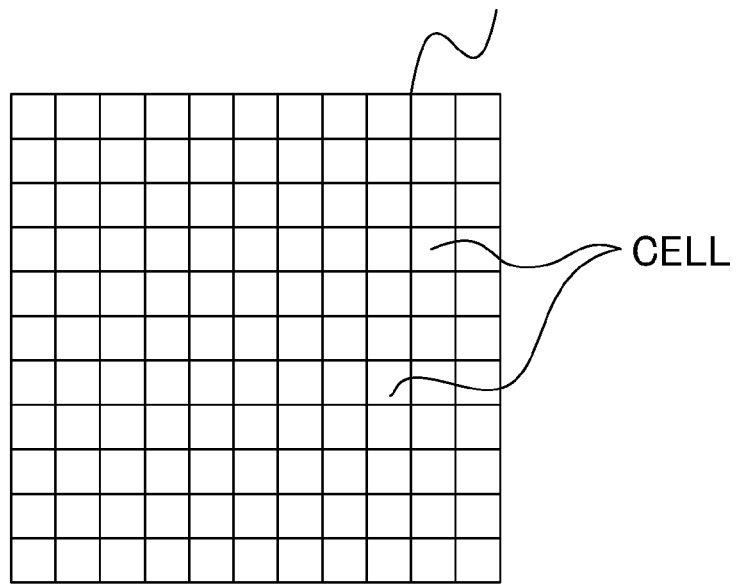
FIG. 4 is an explanatory diagram of an image restoration filter which is used for an image pickup apparatus of Embodiment 1.

FIG. 4 shows an example of an image restoration filter which is made in Step S9. In the image restoration filter, the cell (tap) number is determined in accordance with an aberration of the image pickup optical system 101. The image restoration filter shown in FIG. 4 is a two-dimensional filter which has 11×11 cells. Each cell corresponds to one pixel of an image. The process in Step S9 may be performed as a process other than a series of processes from Step S1 to Step S8 described later, or it may be performed in the series of processes.

The image restoration filter is divided into cells of 100 or more to be a two-dimensional filter to be able to obtain a good image restoration result even for an aberration such as a spherical aberration, a comatic aberration, an on-axis chromatic aberration, or an off-axis chromatic flare by the image pickup optical system 101, which hugely expands from an image position. A convolution process for an input image is performed for the image restoration filter in such an actual space to restore the image without performing a Fourier transform.

Figure 5:
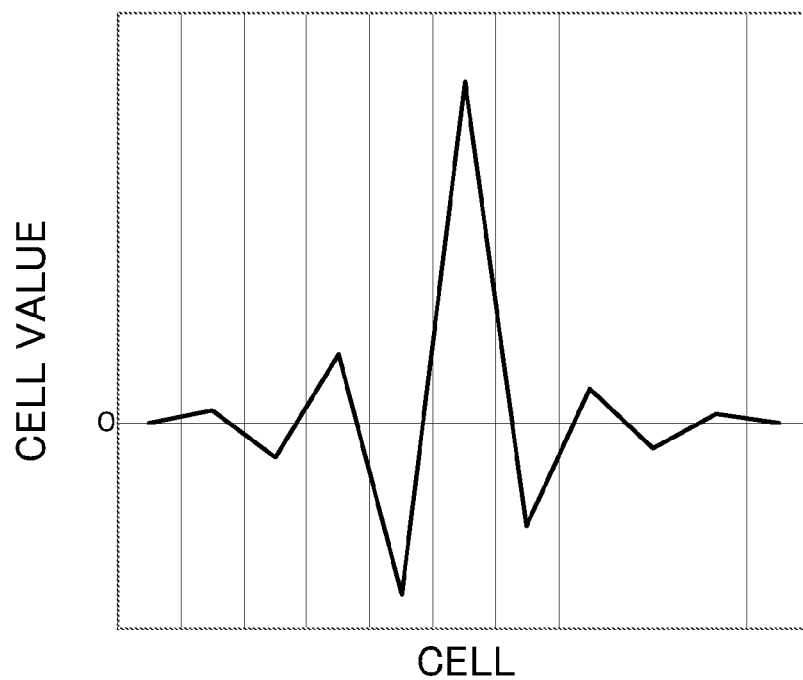
FIG. 5 is a diagram showing a distribution of a cell value of the image restoration filter.

Each cell is set to have a value as shown in FIG. 5 in accordance with aberration information such as a spherical aberration, a comatic aberration, an on-axis chromatic aberration, or an off-axis chromatic flare of the image pickup optical system 101. FIG. 5 shows a cell value at one cross section of the image restoration filter.

The image restoration filter is made by calculating or measuring an optical transfer function (OTF) of the image pickup optical system 101 or the like and by performing an inverse Fourier transform of its inverse function. Generally, since an influence of a noise needs to be considered, a method for making a Wiener filter or a relevant restoration filter can be selectively used.

The optical transfer function in the embodiment preferably includes not only a factor of the image pickup optical system 101 but also a factor which deteriorates the optical transfer function from an output signal of the image pickup element 102 to an input image generated in the image processing portion 104. In other words, the image restoration filter is preferably made by performing the inverse Fourier transform of a function generated based on an inverse function of the optical transfer function of the image pickup optical system 101.

Factors which deteriorate the optical transfer function other than the image pickup optical system 101 are as follows. For example, a low-pass filter (not shown) which is arranged at a front surface of the image pickup element 102 suppresses a high-frequency component with respect to frequency characteristics of the optical transfer function. Similarly, an infrared cut filter which is arranged at the front surface of the image pickup element 102 influences each point spread function (PSF) of RGB channels that are integral values of the PSF of a spectral wavelength, and particularly influences the PSF of the R channel. Further, a shape or an opening ratio of a pixel opening of the image pickup element 102 also influences the frequency characteristics. In addition, spectral characteristics of a light source illuminating an object or wide variety of wavelength filters is also a factor which deteriorates the optical transfer function. Therefore, the image restoration filter is preferably made based on the optical transfer function in a broad sense that considers the factors.

The image pickup optical system 101 may be provided as a part of an image pickup apparatus and it may also be interchangeable with respect to the image pickup apparatus.

When an input image is an RGB type color image, three image restoration filters which correspond to one of color components of R, G, and B are preferably made. Because the image pickup optical system 101 includes a chromatic aberration and the way of the blur is different in each color component, the characteristics preferably differ based on the chromatic aberration in order to obtain an optimal image restoration filter for each color component. In other words, three image restoration filters which have different cell values for each color component, as shown in FIG. 5, are preferably made.

With regard to the number of horizontal and vertical cells (cell arrangement) of the image restoration filter, the cells do not have to be squarely arranged as shown in FIG. 4, and the arrangement can be arbitrarily modified if the cell arrangement is considered at the time of the convolution process.

In FIG. 2, when the image restoration filter is selected or made in Step S3, subsequently in Step S4 (first calculating step), the image processing portion 104 calculates a color difference for each pixel of an input image that is to be processed to store it in the storage portion 108 before an image restoration process described later. In the embodiment, the input image is constituted by RGB components, and the color difference is defined as a ratio of signal values of the other color components (red R and blue B) with respect to green G that is a reference color component. Therefore, the color difference is calculated by the following expressions.

$$C1r(x,y)=R1(x,y)/G1(x,y)$$

$$C1b(x,y)=B1(x,y)/G1(x,y)$$

In the embodiment, R1, G1, and B1 are signal values of R, G, and B in the input image before the image restoration process, respectively. Symbol (x,y) denotes a coordinate on an image. $C1r$ and $C1b$ denote color differences of the R component and the B component with respect to the G component, which are defined in the above expressions.

Next, in Step S5 (image restoration step), the image processing portion 104 performs an image restoration process for the input image using the image restoration filter selected or made (corrected) in Step S3. Specifically, a convolution process is performed for the input image by using the image restoration filter. Thus, a blur component of an image caused by an aberration of the image pickup optical system 101 can be removed or reduced. In this case, as described above, an optimal image restoration filter is used for each of the color components of R, G, and B to be able to correct (remove or reduce) the chromatic aberration along with the blur component.

Next, in Step S6 (second calculating step), the image processing portion 104 calculates a color difference for each pixel of an image after the image restoration process (restored image) to store it in the storage portion 108. The color difference after the image restoration process is calculated by the following expressions.

$$C2r(x,y)=R2(x,y)/G2(x,y)$$

$$C2b(x,y)=B2(x,y)/G2(x,y)$$

In the embodiment, R2, G2, and B2 denote signal values of R, G, and B after the image restoration process, respectively. Symbol (x,y) denotes a coordinate on an image. $C2r$ and $C2b$ denote color differences of the R component and the B component with respect to the G component, which are defined in the above expressions.

Next, in Step S7, after the image processing portion 104 has calculated the color difference after the image restoration process, it determines whether or not the color difference for each pixel on the restored image increases as compared with the color difference for each pixel on the input image before the image restoration process using the following expressions. Jr and Jb denote increase rates of the color differences for the R component and the B component with respect to the G component, which are defined in the following expressions, and symbol (x,y) denotes the same pixel on the restored image as that of the input image.

$$Jr(x,y)=C2r(x,y)/C1r(x,y)$$

$$Jb(x,y)=C2b(x,y)/C1b(x,y)$$

When the increase rate J of the color difference is smaller than 1, it indicates that the color difference after the image restoration process decreases as compared with that before the image restoration process, and it means that a color taste as an image decreases. In other words, the red decreases in the increase rate Jr and the blue decreases in the increase rate Jb. When the increase rate J of the color difference is equal to 1, it indicates that the color difference after the image restoration process does not change as compared with that before the image restoration process.

Further, when the increase rate J of the color difference is greater than 1, it indicates that the color difference after the image restoration process increases as compared with that before the image restoration process, and it means that the color taste as an image increases. In other words, the red increases in the increase rate Jr, and the blue increases in the increase rate Jb.

However, the increase and decrease of the color difference is not the same meaning as that of sharpness of an image, and the sharpness of the image is improved by the image restoration process. Because the color difference is a ratio with respect to a reference color, as described above, it represents a brightness ratio regardless of the sharpness of the reference color.

Figure 6:
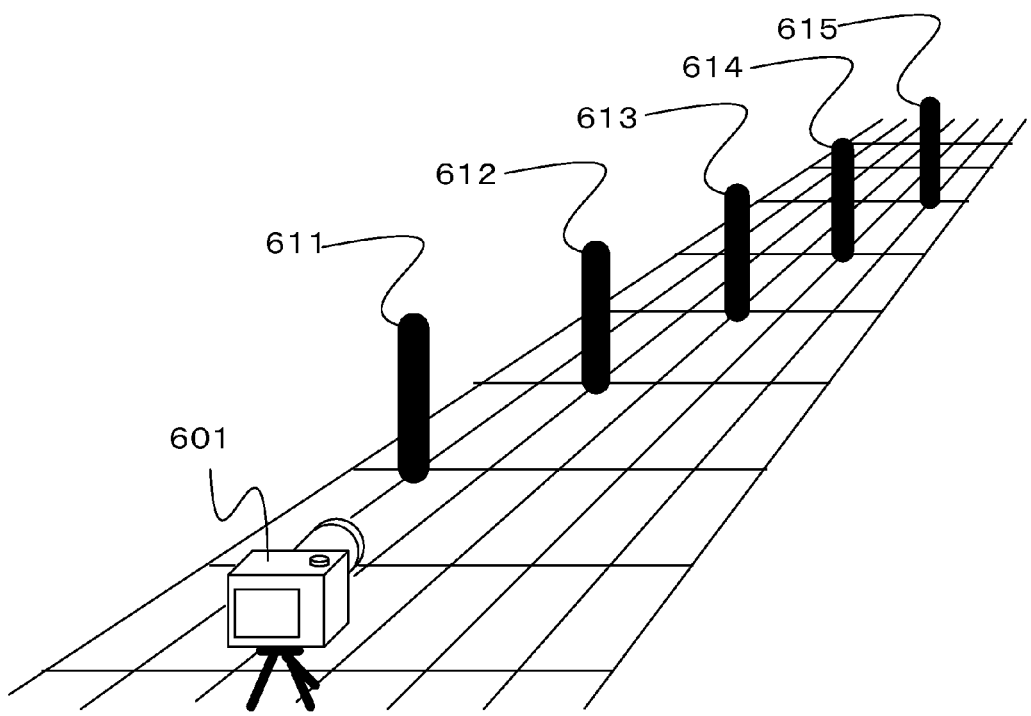
FIG. 6 is an explanatory diagram of an object to be imaged by an image pickup apparatus of Embodiment 1.

Referring to FIG. 6, examples of cases where the increase rate of the color difference is smaller than 1 and it is greater than 1 will be described. FIG. 6 shows a situation where black bars 611 to 615 that are objects arranged obliquely from a short distance to a long distance with respect to an image pickup apparatus 601 are imaged by the image pickup apparatus 601. The image pickup optical system 101 focuses on an object 613.

Figure 7:
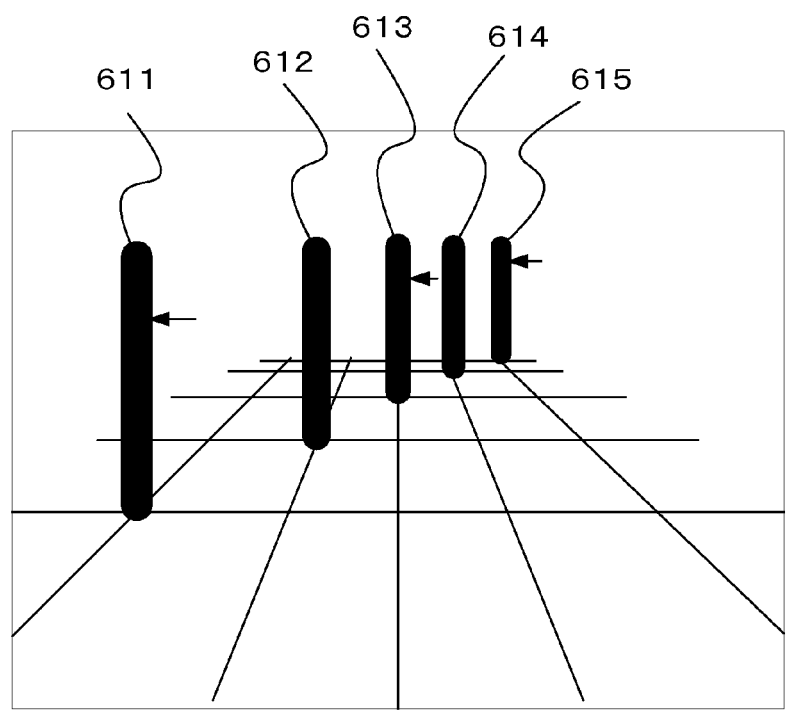
FIG. 7 is an explanatory diagram of an input image which is obtained by the image pickup apparatus.
Figure 8:
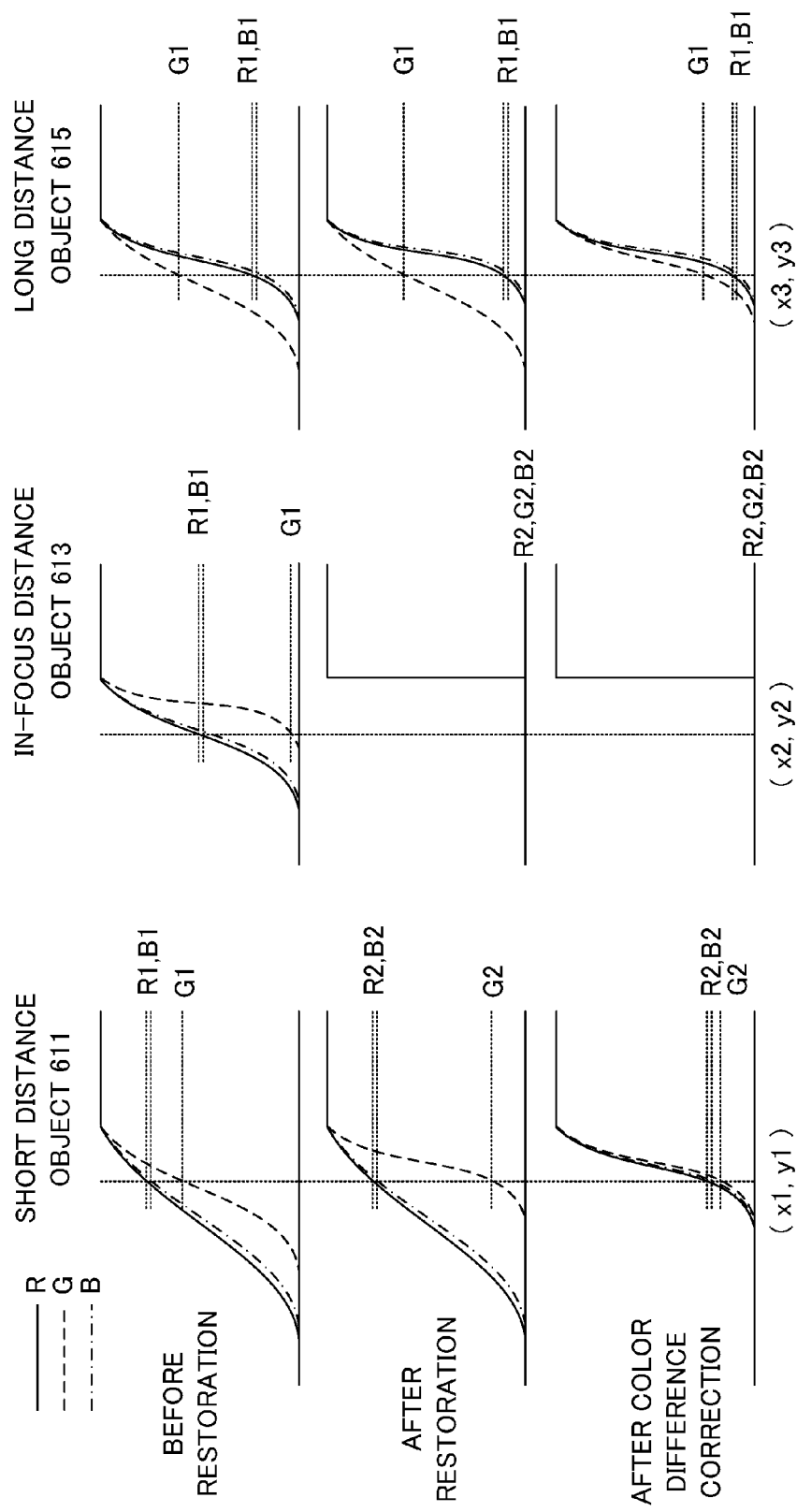
FIG. 8 is a diagram showing signal values of R, G, and B of the input image.
Figure 9:
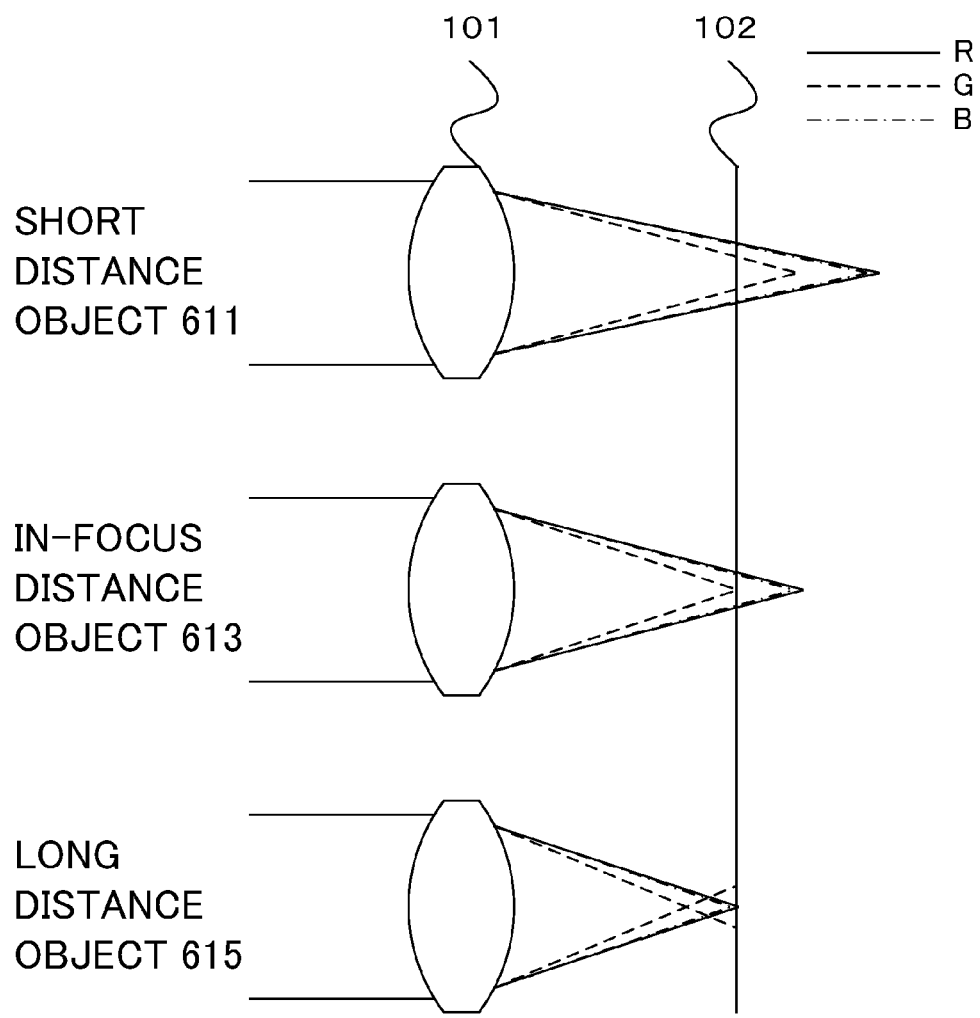
FIG. 9 is an explanatory diagram of a chromatic aberration in an image pickup apparatus of Embodiment 1.

FIG. 7 shows an image (input image) imaged in this situation. FIG. 8, on the upper side, shows signal values (R1, G1, and B1) of R, G, and B at arrow positions (pixels) of the objects 611, 613, and 615 in the input image in FIG. 7. The object 613 is an in-focus object, and the object 611 is an out-of-focus object which is positioned at a distance shorter than the in-focus distance. The object 615 is an out-of-focus object which is positioned at a distance longer than the in-focus distance. Before the image restoration process, in the G component of the object 613 that is an in-focus object, a blur of an edge portion is the least. On the other hand, the R component and the B component are blurred similarly to each other, and these components are blurred as compared with the G component. Referring to FIG. 9, an image pickup state on the image pickup element 102 in this case will be described.

FIG. 9 shows an image pickup state of incident lights of R, G, and B onto the image pickup element 102 in each object distance. In an in-focus distance shown on the middle, the G component is imaged at one point on the image pickup element 102, but on the other hand, the R component and the B component are imaged on the image pickup element 102 with a spread. In a long distance shown on the lower side, the R component and the B component are imaged at one point on the image pickup element 102, but on the other hand, the G component is imaged on the image pickup element 102 with a spread. In a short distance shown on the upper side, all components of R, G, and B are imaged on the image pickup element 102 with a spread, and particularly each of the R and B components has a spread wider than that of the G component.

FIG. 9 shows an influence on the imaging of the on-axis chromatic aberration, but also at a position of a field angle other than an on-axis position, a phenomenon similar to that of FIG. 9 is generated for each color although asymmetry is generated in basic imaging characteristics. The signal values at a short distance, an in-focus distance, and a long distance before the image restoration process shown in FIG. 8 may be understood by the above description.

The following expressions represent a method for calculating color differences C1r and C1b of the objects 611, 613, and 615 (short distance, in-focus distance, and long distance) in the input image before the image restoration process, which is calculated in Step 4 described above. Coordinates (x1,y1), (x2,y2), and (x3,y3) denote coordinates of pixels at arrow positions in the objects 611, 613, and 615 of FIG. 7, respectively.

$$C1r(x1,y1)=R1(x1,y1)/G1(x1,y1)$$

$$C1b(x1,y1)=B1(x1,y1)/G1(x1,y1)$$

$$C1r(x2,y2)=R1(x2,y2)/G1(x2,y2)$$

$$C1b(x2,y2)=B1(x2,y2)/G1(x2,y2)$$

$$C1r(x3,y3)=G1(x3,y3)/R1(x3,y3)$$

$$C1b(x3,y3)=G1(x3,y3)/B1(x3,y3)$$

In Step S7, in order to easily determine whether or not the color difference has increased after the image restoration process, with regard to the numerator and denominator in calculating the color differences C1r and C1b, a color component which has a large signal value in a signal value before the image restoration process is preferably set to the numerator. When the color difference is calculated after the image restoration process, regardless of the size of the signal value, the relation of the numerator and denominator is maintained. Thus, whether or not the color difference has increased in Step S7 can be determined regardless of the relation of size of the color components.

FIG. 8, on the middle, shows signal values (R2, G2, and B2) of R, G, and B at arrow positions of the objects 611, 613, and 615 in FIG. 7 in a restored image, after the image restoration process, for which a color difference correcting process described later is not performed.

In the image restoration process, as a result of a correction of the aberration by using an optimized image restoration filter with respect to an in-focus distance, a blur component at an edge portion in the object 613 at the in-focus distance is appropriately corrected. On the other hand, in the object 611 at a short distance, a blur of the G component is somewhat corrected, but a correction effect does not appear for the R component and the B component. In the object 615 at a long distance, a blur of the R component and the B component is somewhat corrected, but a correction effect does not appear for the G component.

Figure 10:
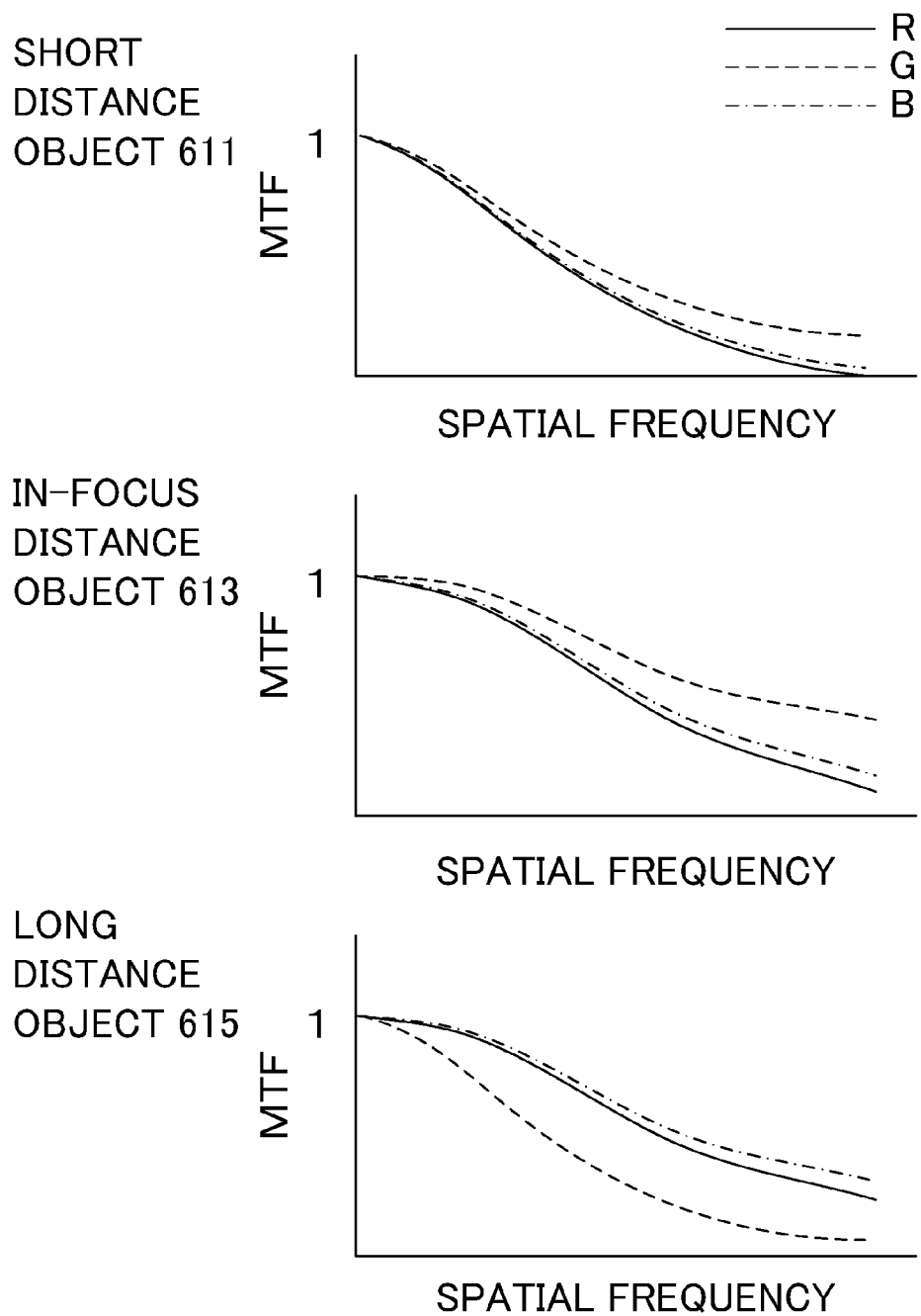
FIG. 10 is an explanatory diagram of MTF of R, G, and B in Embodiment 1.

Referring to FIG. 10, this phenomenon will be described. FIG. 10 shows spatial frequency characteristics of MTF of the image pickup optical system 101 at a short distance, an in-focus distance, and a long distance, and they correspond to the image pickup states at the short distance, the in-focus distance, and the long distance, respectively, shown in FIG. 9.

At the in-focus distance, the MTF corresponds to an imaging performance in a common in-focus state. At the long distance, as described with reference to FIG. 9, the R component and the B component are appropriately imaged while the G component is imaged with a spread. Therefore, the MTF is deteriorated only in the G component. At the short distance, all of the R, G and B components are imaged with a spread, and particularly the R component and the B component have a spread wider than that of the G component. Therefore, the MTF is totally low. Particularly, the MTF of the R component and the B component is low.

In the embodiment, the image restoration process is a process of correcting a deteriorated component (a blur component) caused by an aberration in an image, and in view of frequency surface, it corresponds to improving the MTF of FIG. 10. The image restoration filter is a real surface convolution filter, and in view of the effect on the frequency surface, it is a filter which improves an amplitude component of the MTF (actually OTF). Further, the image restoration filter also corrects a phase shift component of the OTF.

The image restoration filter is optimized for improving the MTF at the in-focus distance. However, even if it is applied to an out-of-focus distance such as a short distance or a long distance, an improving effect of the MTF can be somewhat obtained although it is not optimized. Therefore, as shown in FIG. 8, even if the case of the out-of-focus distance such as the short distance or the long distance, a blur at the edge portion is somewhat corrected.

However, as shown in FIG. 10, for example in a case of the long distance, because the MTF of the G component is significantly deteriorated, the blur at the edge portion shows little change even if the MTF is somewhat improved. However, because the deterioration of the MTF is small for the R component and the B component, the reduction effect of the blur at the edge portion is high if the MTF is improved a little bit. This is true for the case of the short distance.

The following expressions represent a method for calculating color differences C2r and C2b of the objects 611, 613, and 615 (a short distance, an in-focus distance, and a long distance) in the restored image after the image restoration process, which are calculated in Step S6 described above.

$$C2r(x1,y1)=R2(x1,y1)/G2(x1,y1)$$

$$C2b(x1,y1)=B2(x1,y1)/G2(x1,y1)$$

$$C2r(x2,y2)=R2(x2,y2)/G2(x2,y2)$$

$$C2b(x2,y2)=B2(x2,y2)/G2(x2,y2)$$

$$C2r(x3,y3)=G2(x3,y3)/R2(x3,y3)$$

$$C2b(x3,y3)=G2(x3,y3)/B2(x3,y3)$$

The following expressions represent a method for calculating increase rates Jr and Jb of the color differences of the objects 611, 613, and 615 (a short distance, an in-focus distance, and a long distance) after the image restoration process with respect to those before the image restoration process, which are calculated in Step S7 described above.

$$Jr(x1,y1)=C2r(x1,y1)/C1r(x1,y1)$$

$$Jb(x1,y1)=C2b(x1,y1)/C1b(x1,y1)$$

$$Jr(x2,y2)=C2r(x2,y2)/C1r(x2,y2)$$

$$Jb(x2,y2)=C2b(x2,y2)/C1b(x2,y2)$$

$$Jr(x3,y3)=C2r(x3,y3)/C1r(x3,y3)$$

$$Jb(x3,y3)=C2b(x3,y3)/C1b(x3,y3)$$

If signal values are obtained as shown in FIG. 8, the increase rates of the color differences are represented as follows.

$$Jr(x1,y1)>1$$

$$Jb(x1,y1)>1$$

$$Jr(x2,y2)<1$$

$$Jb(x2,y2)<1$$

$$Jr(x3,y3)>1$$

$$Jb(x3,y3)>1$$

With regard to a pixel having an increase rate J of the color difference greater than 1, the color difference is greater than that before the image restoration process. In other words, a false color is generated. Therefore, in FIG. 2, the flow proceeds from Step S7 to Step S8, and a color difference correcting process is performed for the pixel (specific pixel). On the other hand, with regard to a pixel having an increase rate J of the color difference smaller than 1, the color difference is smaller than that before the image restoration process, i.e. a chromatic aberration is appropriately corrected. Therefore, the process is finished.

In FIG. 8, on the lower side, signal values of R, G, and B in an output image after a color difference correcting process is performed for the restored image are shown. At the in-focus distance, because the color difference correcting process is not necessary, a signal value of the restored image is used as it is.

The color difference correcting process is performed so that a color difference (i.e. a signal value of certain color component) of an pixel (specific pixel) whose color difference has increased in the restored image comes close to or returns to a color difference before the image restoration process, based on the following correcting expressions. In other words, in the color difference correcting process, a signal value of a specific pixel in the restored image is corrected so that a difference is reduced in accordance with the difference between a color difference of a specific pixel in an input image and a color difference of the specific pixel in the restored image.

Symbol k denotes a correction coefficient, and when k=1 is satisfied, it indicates that a color difference is completely returned to that before the image restoration process. A range of the correction coefficient k is preferably set to 0.8<k<1.2. Coordinates of the pixels at the right side of the correcting expressions below are the same as those of the pixels (specific pixels) at the left side, and accordingly the descriptions are omitted.

$$R2(x1,y1)=k\cdot R1\cdot G2/G1$$

$$B2(x1,y1)=k\cdot B1\cdot G2/G1$$

$$R2(x2,y2)=k\cdot R1\cdot G2/G1$$

$$B2(x2,y2)=k\cdot B1\cdot G2/G1$$

$$R2(x3,y3)=k\cdot R1\cdot G2/G1$$

$$B2(x3,y3)=k\cdot B1\cdot G2/G1$$

In the above correcting expressions, signal values (brightness values) of the R component and the B component are corrected without changing the signal value (brightness value) of the G component.

As another method for correcting a color difference, among a signal value of the G component that is a reference color and a signal value of the R component or the B component, higher signal value can also be corrected with reference to a lower signal value. In an example of FIG. 8, because the signal value of the G component is low in both cases of the short distance and the in-focus distance, the signal values of the R component and the B component are corrected by the above correcting expressions.

On the other hand, at the long distance, because the signal values of the R component and the B component are lower than that of the G component, the signal value of the G component is corrected based on the following correcting expressions. G2r denotes a signal value of the G component corrected based on the R component, and G2b denotes a signal value of the G component corrected based on the B component. The final signal value G2 may be for example obtained by simply averaging G2r and G2b as described below, and a weighted average may also be used if necessary.

$$G2r(x3,y3)=k\cdot G1\cdot R2/R1$$

$$G2b(x3,y3)=k\cdot G1\cdot B2/B1$$

$$G2=(G2r+G2b)/2$$

Thus, in the color difference correcting process, which color component among the color components of R, G, and B should be fixed (should be a reference) is arbitrarily selectable. When a blur way of the G component is considered to be a reference, the G component may be fixed. In this case, an object at the long distance can be significantly blurred. When the sharpness is preferred and an image having a deep focal depth is desired, a color component whose signal value is low may be fixed and an example of this case is shown in FIG. 8 on the lower side. Further, a fixed color component may be arbitrarily changed in a range of satisfying a condition of the color difference. In any of the above, the generation of a false color in an output image can be suppressed.

A reference color in calculating the color difference is not limited to the G component, but the R component or the B component may be adopted as a reference color and the reference color may also be changed for each area on an image.

Thus, the process of FIG. 2 is finished by obtaining signal values of all pixels (specific pixels) whose color differences have increased by the image restoration process, i.e. the output image whose amount of characteristics relating to the color has been corrected.

In the color difference correcting process (Step S8), a correction may be performed for a pixel (specific pixel) requiring a correction so as to be returned to a signal value of an original image before the image restoration process (an image taken by an image pickup apparatus). In this case, the image restoration process is not performed for a part (a pixel, or a pixel in a certain area) which is determined that a false color has been generated to maintain the original image. Because the image restoration process is not performed for the part, the false color is not generated.

Such a correction is effective when a level of the false color which is generated as a result of the image restoration process is large and an original image (shot image) in which a false color is not generated is preferable (when it is preferable that restoration is not performed). With regard to certain pixel, if the generation of a large false color as a result of the image restoration process is predicted, the image restoration process may not be performed for the pixel without calculating the amount of characteristics (color difference) for the pixel.

Figure 3:
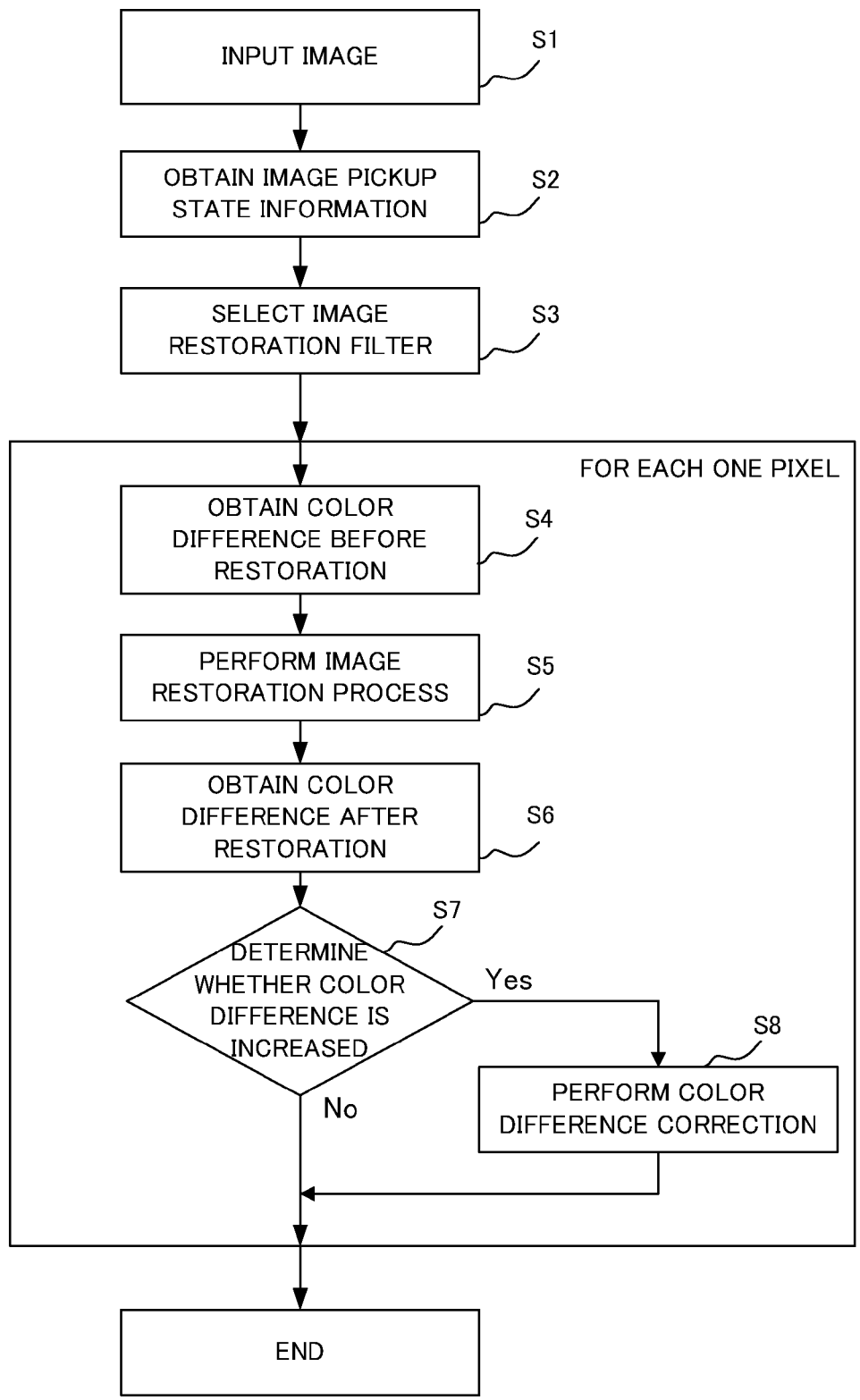
FIG. 3 is a flowchart showing a modified example of a process which is performed by an image pickup apparatus of Embodiment 1.

In the process shown in FIG. 2, the case where the color difference correcting process (Step S8) is performed for an overall image for which the image restoration process (Step S5) is finished has been described. However, as shown in FIG. 3, a process where the image restoration process (Step S5) is performed for one pixel on the image and the color difference comparison (Step S7) and the color difference correction (Step S8) are performed for the one pixel to determine a signal value of the one pixel may be performed for each pixel. Further, in accordance with the purpose of speeding up or the like, the process may be performed for each area including a plurality of pixels. Step S9 is omitted in FIG. 3.

Thus, although each process is separately shown in FIG. 2, some processes can be collected to one process to perform it for each pixel (or area).

In the present embodiment, although a method for suppressing a false color generated by the image restoration process for an out-of-focus object has been described, according to the image processing method of the present invention, the image restoration process is not limited to be applicable to the out-of-focus object and regardless of the cause, the generation of a false color caused by the image restoration process can be suppressed.

Further, for example, other processes such as a distortion correcting process, a periphery light intensity correcting process, and a noise reduction process can be combined with the process in FIG. 2.

In FIG. 1, the output image for which the image restoration process and the color difference correcting process have been performed by the image processing portion 104 is stored in an image recording medium 109 such as a semiconductor memory or an optical disc in a predetermined format. The output image is a high quality image that a false color generated by the image restoration process has been reduced and that is sharpened.

The output image is displayed on a display 105 or is outputted to an outside of the image pickup apparatus (a printer or a database).

A control of a series of operations such as a photoelectric conversion by the image pickup element 102, an image processing by the image processing portion 104, a recording on the image recording medium 109, and an image display on the display 105, as described above, is performed by a system controller 110. A zoom drive or a focus drive of the image pickup optical system 101 is controlled by an image pickup optical system controller 106 in accordance with an instruction of the system controller 110.

Because the optical transfer function (OTF) described above changes in accordance with a field angle (image height) even if image pickup states are similar to each other, the image restoration process described above is preferably performed by changing the image restoration filter for each of divided areas in accordance with the image height in an image. A convolution process may be performed while the image restoration filter is scanned on the image, and the image restoration filter may be changed in series for each of the divided areas.

In the present embodiment, an image pickup apparatus which uses an image processing method of the present invention, i.e. which is provided with an image processing apparatus, has been described, but the image processing method of the present invention can also be performed by an image processing program which is installed in a personal computer. In this case, the personal computer corresponds to the image processing apparatus of the present invention. The personal computer receives or obtains an image before an image restoration process, i.e. an input image, which has been generated by an image pickup apparatus to perform an image restoration process or a color difference correcting process by the image processing program to output the image obtained by the result.

In order to perform the process described above at a high speed, an edge portion in the input image and the restored image can also be extracted to perform a correction of a signal value only for a pixel of the edge portion.

Further, for the similar purpose, the signal value can also be corrected only for a pixel having signal value intensity equal to or greater than a predetermined threshold value.

Embodiment 2

Next, Embodiment 2 of the present invention will be described. An image processing method of the present embodiment is also performed by the same image pickup apparatus as that of Embodiment 1. Therefore, in the present embodiment, elements common to or having the same functions as those of Embodiment 1 are denoted by the same reference numerals as those of Embodiment 1. The process of the present embodiment may also be performed by a personal computer (image processing apparatus).

In Embodiment 1, the case where one pixel of an input image has signal values of three color components of R, G, and B has been described. On the other hand, in the present embodiment, a case where one pixel of an input image is a RAW image which has only one signal value of any one color component selected from among R, G, and B will be described. The RAW image is generated by using a pixel sensor (image pickup element) in which a color filters of R, G, and B are arrayed in a Bayer array.

Because each pixel of the RAW image has only a signal value of one color component, a color synthesizing process (demosaicing process) is performed to give each pixel of the output image signal values of three color components of R, G, and B. The color synthesizing process performs an interpolation process using signal values of a plurality of pixels around a pixel to be processed to give the pixel signal values of R, G, and B.

In the present embodiment, whether the image restoration process is performed before or after the color synthesizing process may be determined by comprehensively judging a performance of an image pickup system including an imaging system and an image processing portion 104. As described above, since a deteriorating process of an image is a linear process which corresponds to performing a convolution of an original image by a point spread function (PSF), the restoration process is also a linear process in principle. On the other hand, the color synthesizing process is a nonlinear process. Therefore, in a normal situation, the image restoration process is preferably performed before the color synthesizing process.

Because the RAW image has only one signal value for each pixel, an amount of characteristics relating to a color can not be extracted for each pixel as described in Embodiment 1. Therefore, the image restoration process and the color synthesizing process are performed after the amount of characteristics relating to the color is extracted (generated) in accordance with the flowchart shown in FIG. 11.

Figure 11:
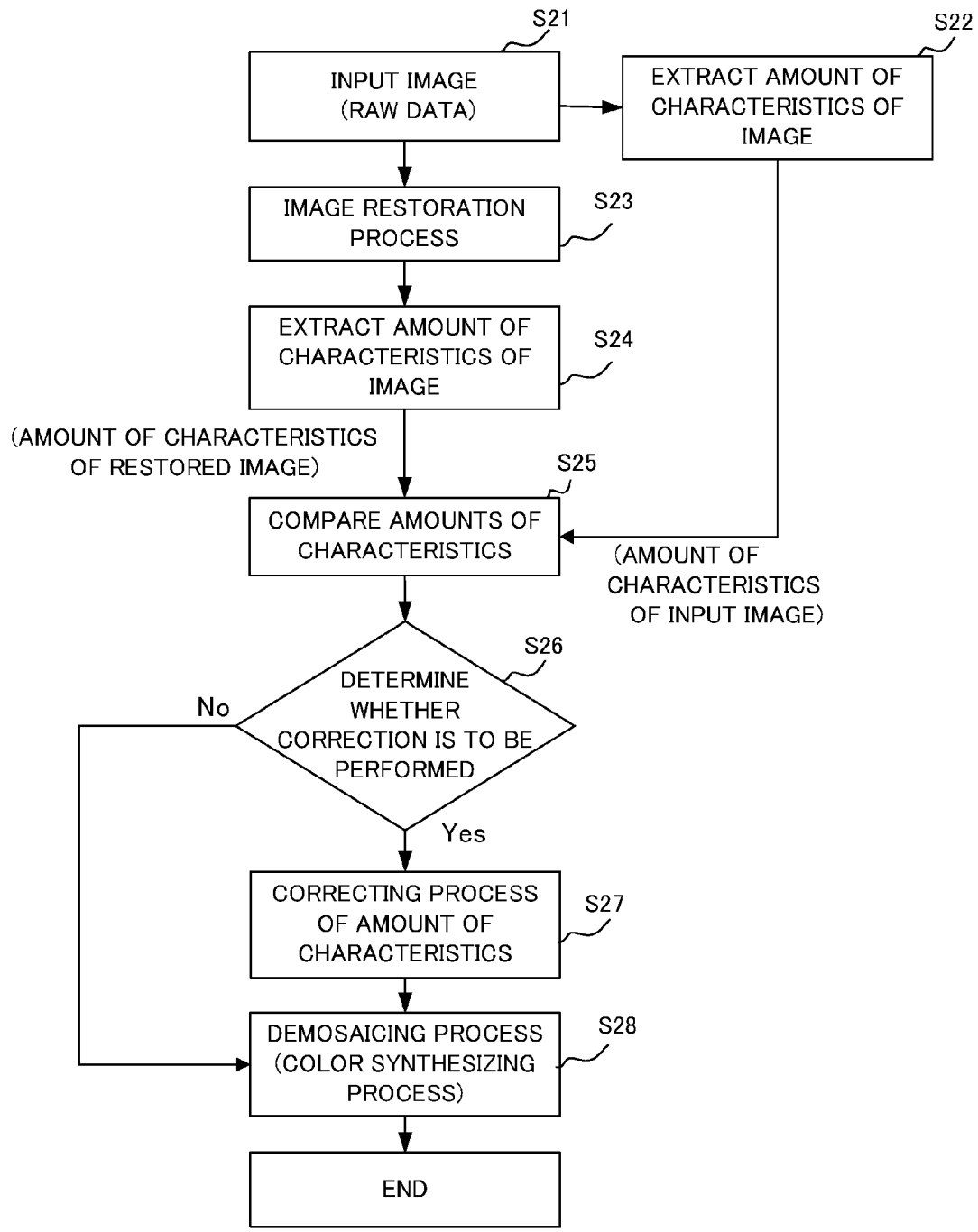
FIG. 11 is a flowchart showing a process which is performed by an image pickup apparatus that is Embodiment 2 of the present invention.

The process (image processing method) shown in FIG. 11 is also performed in accordance with a computer program in the image processing portion 104 (image restoration processing portion 104a).

In FIG. 11, in Step S21, the image processing portion 104 obtains a RAW image as an input image (hereinafter, referred to as an "input RAW image"). In Step S22 (first calculating step), the image processing portion 104 extracts an amount of characteristics relating to a color of each pixel in the input RAW image. The amount of characteristics relating to the color of the pixel in the input RAW image is extracted by the above color synthesizing process which uses a signal value of a pixel for which the amount of characteristics is to be generated and a signal value of the peripheral pixel or a process to which the color synthesizing process is simplified. In other words, the amount of characteristics relating to the color of the pixel for which the amount of characteristics is to be generated can be obtained as a ratio of signal values of three color components of R, G, and B which are obtained from the pixel and the peripheral pixel.

In addition, the "amount of characteristics relating to a color" such as a lightness, a hue, a chroma, which are represented by LCH, a brightness represented by YCbCr, or a color difference signal can be obtained in a variety of color spaces which are generally used. As a color space, there is also XYZ, Yuv, JCh, or the like. Further, as the "amount of characteristics relating to a color", a color temperature can also be used.

Thus, there are a variety of methods of representing the amount of characteristics relating to the color, and the amount of the characteristics relating to the color of a pixel can be represented by each representing method. The "amount of characteristics relating to a color taste" means that all of these are included. This is not limited to the present embodiment in which the RAW image is an object, but the same is true for a case where one pixel has signal values of a plurality of color components as described in Embodiment 1.

The amount of characteristics relating to the color of each pixel, which has been extracted in this manner is temporarily stored in the storage portion 108 shown in FIG. 1.

Next, in Step S23 (image restoration step), the image processing portion 104 performs an image restoration process for the input RAW image.

In Step S24 (second calculating step), the image processing portion 104 extracts an amount of characteristics relating to a color of each pixel in a restored RAW image which has been obtained by the image restoration process in Step S23. The amount of characteristics relating to the color of the pixel is also extracted by the above color synthesizing process which uses a signal value of a pixel for which the amount of characteristics is to be generated and a signal value of a peripheral pixel or a process to which the color synthesizing process is simplified as described above.

Next, in Step S25, the image processing portion 104 compares the amount of characteristics relating to the color calculated in the input RAW image before the image restoration process with the amount of characteristics relating to the color calculated in the restored RAW image after the image restoration process for each pixel (specific pixel). In Step S26, the image processing portion 104 determines whether or not a correction of the amount of characteristics relating to the color, i.e. a correction of a signal value of a pixel, is necessary based on the comparison result.

The determination may be performed by the same method as that of Embodiment 1 or a comparison method corresponding to L*a*b*, YCbCr, or the like as a color space may also be adopted. For example, when L*a*b* is used, a value of ΔE as a color difference can be used. Since a lightness L* is supposed to be changed by the image restoration process, as a method of evaluating only a color, at least one of a hue angle h and a chroma C which are represented by the following definitional expressions may be used.

$$h = \tan^{-1}(b^*/a^*)$$

$$C = [(a^*)2 + (b^*)2]^{1/2}$$

Since YCbCr is supposed to be changed by the image restoration process with regard to the brightness Y, as a method of evaluating only a color, CbCr of the restored RAW image may be compared with CbCr of the input RAW image. In addition, uv of Yuv or uv of Luv may be used.

When the correction is not necessary by the determination of necessity of the correction, the flow proceeds to Step S28, and the image processing portion 104 performs a color synthesizing process to obtain an output image. On the other hand, when the correction is necessary, the flow proceeds to Step S27.

In Step S27, the image processing portion 104 corrects the amount of characteristics relating to the color of the pixel of the restored RAW image (signal value of the pixel) in accordance with the difference between the amount of characteristics relating to the color of the pixel in the input RAW image and the amount of characteristics relating to the color of the pixel of the restored RAW image. In other words, the correction is performed so as to reduce the difference.

An amount of the correction in this case may be determined in accordance with an acceptable amount of the false color that is to be set for the output image, an image quality level that is to be obtained, a load of the process, or the like.

For example, when the color space of L*a*b* is used, a specific reference color (for example, G) is fixed if the chroma C described above is beyond a specific threshold value and the other color components (for example, R and B) are corrected so that the value of the chroma C is close to the value before the restoration. There is also a method of using a signal value of an original image before the restoration as it is for the pixel if the chroma C is beyond the specific threshold value. In this case, the sharpness is improved as a whole image, and only a part in which a false color is generated has the same sharpness as that before the restoration. It is effective if a case where the restoration is not performed prefers to a case where the false color is generated.

In Step S28, the image processing portion 104 performs a color synthesizing process for the corrected RAW image to obtain an output image.

Figure 12:
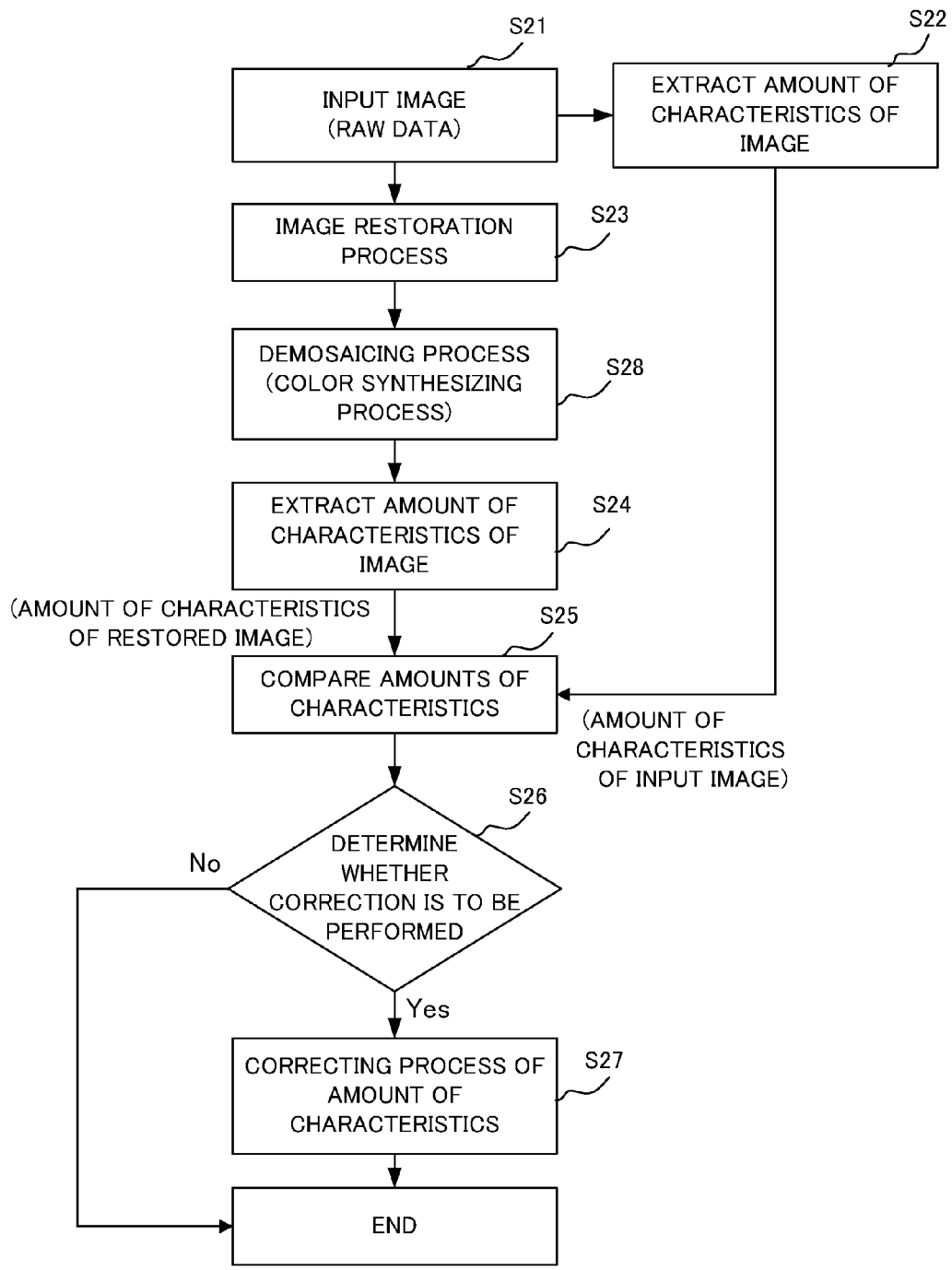
FIG. 12 is a flowchart showing a modified example of a process which is performed by an image pickup apparatus of Embodiment 2.

As shown in FIG. 12, the color synthesizing process (Step S28) may also be performed immediately after the image restoration process (Step S23) to compare amounts of characteristics relating to colors of pixels between the restored RAW image for which the color synthesizing process has been performed and the input RAW image before the image restoration process.

As described in Embodiment 1, other processes such as a distortion correcting process, a peripheral light intensity correcting process, and a noise reduction process can also be performed in combination with the process shown in FIG. 11 or 12.

Further, as described in Embodiment 1, in order to perform the process at a high speed, edge portions in the input RAW image and the restored RAW image can also be extracted to correct an amount of characteristics relating to a color only for a pixel (and a peripheral pixel) of the edge portion. For the same purpose, the amount of characteristics relating to the color can also be corrected only for a pixel (and a peripheral pixel) having signal value intensity equal to or greater than a predetermined threshold value.

According to each of the above embodiments, because the generation of a false color caused by performing an image restoration process for a color input image obtained by the imaging can be suppressed, a blur component is appropriately corrected and a high quality input image with a low false color can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-252322, filed on Sep. 30, 2008, which is hereby incorporated by reference herein in its entirety.

What is claimed is:

1. An image processing method comprising:
   obtaining a color input image produced by taking an image using an optical system;
   calculating a color difference of a pixel in the input image;
   performing an image restoration process for the input image using an image restoration filter selected or made based on aberration information of the optical system;
   calculating a color difference of a pixel in a restored image obtained by the image restoration process; and
   correcting a signal value of a specific pixel in the restored image in a case that the calculated color difference of the specific pixel in the restored image is larger than the calculated color difference of the specific pixel in the input image, such that a difference between the calculated color difference of the specific pixel in the restored image and the calculated color difference of the specific pixel in the input image is reduced.

2. An image processing method according to claim 1, wherein the image restoration filter is made by performing an inverse Fourier transform of a function generated based on an inverse function of an optical transfer function of the optical system.

3. An image processing method according to claim 1, wherein the specific pixel is a pixel at an edge portion of the input image.

4. An image processing method according to claim 1, wherein, in the case that the calculated color difference of the specific pixel in the restored image is larger than the calculated color difference of the specific pixel in the input image calculated, the signal value of the specific pixel in the restored image is corrected to a signal value of the specific pixel in the input image.

5. An image processing method according to claim 1, wherein the color difference is a difference between a signal value of a first color component and a signal value of a second color component.

6. An image processing method according to claim 1, wherein the color difference is a ratio between a signal value of a first color component and a signal value of a second color component.

7. An image processing method according to claim 1, wherein the image restoration filter is generated based on an optical transfer function of the optical system.

8. An image processing apparatus which processes a color input image produced by taking an image using an optical system, the image processing apparatus comprising:
   a first calculating device configured to calculate a color difference of a pixel in the input image;
   a storage device configured to store an image restoration filter selected or made based on aberration information of the optical system;
   an image restoration device configured to perform an image restoration process for the input image using the image restoration filter;
   a second calculating device configured to calculate a color difference of a pixel in a restored image obtained by the image restoration process, and
   a correcting device configured to correct a signal value of a specific pixel in the restored image, in a case that the calculated color difference of the specific pixel in the restored image is larger than the calculated color difference of the specific pixel in the input image, such that a difference between the calculated color difference of the specific pixel in the restored image and the calculated color difference of the specific pixel in the input image is reduced.

9. An image processing apparatus according to claim 8, wherein the correcting device is configured to, in the case that the calculated color difference of the specific pixel in the restored image is larger than the calculated color difference of the specific pixel in the input image, correct the signal value of the specific pixel in the restored image to a signal value of the specific pixel in the input image.

10. An image processing apparatus according to claim 8, wherein the color difference is a difference between a signal value of a first color component and a signal value of a second color component.

11. An image processing apparatus according to claim 8, wherein the color difference is a ratio between a signal value of a first color component and a signal value of a second color component.

12. An image processing apparatus according to claim 8, wherein the image restoration filter is generated based on an optical transfer function of the optical system.

13. An image pickup apparatus comprising:
   an image pickup system configured to perform a photoelectric conversion of an object image formed by an optical system to produce a color input image; and
   an image processing apparatus configured to process the input image,
   wherein the image processing apparatus is configured to process the color input image produced by taking an image using the optical system, and
   wherein the image processing apparatus comprises:

a first calculating device configured to calculate a color difference of a pixel in the input image;

a storage device configured to store an image restoration filter selected or made based on aberration information of the optical system;

an image restoration device configured to perform an image restoration process for the input image using the image restoration filter;

a second calculating device configured to calculate a color difference of a pixel in a restored image obtained by the image restoration process, and a correcting device configured to correct a signal value of a specific pixel in the restored image, in a case that the calculated color difference of the specific pixel in the restored image is larger than the calculated color difference of the specific pixel in the input image, such that a difference between the calculated color difference of the specific pixel in the restored image and the calculated color difference of the specific pixel in the input image is reduced.

14. An image pickup apparatus according to claim 13, wherein the correcting device is configured to, in the case that the calculated color difference of the specific pixel in the restored image is larger than the calculated color difference of the specific pixel in the input image, correct the signal value of the specific pixel in the restored image to a signal value of the specific pixel in the input image.

15. An image pickup apparatus according to claim 13, wherein the color difference is a difference between a signal value of a first color component and a signal value of a second color component.

16. An image pickup apparatus according to claim 13, wherein the color difference is a ratio between a signal value of a first color component and a signal value of a second color component.

17. An image processing apparatus according to claim 13, wherein the image restoration filter is generated based on an optical transfer function of the optical system.

18. One or more non-transitory computer-readable storage media which stores a program for executing, by one or more computers, an image processing operation comprising:

obtaining a color input image produced by taking an image using an optical system;

calculating a color difference of a pixel in the input image;

performing an image restoration process for the input image using an image restoration filter selected or made based on aberration information of the optical system;

calculating a color difference of a pixel in a restored image obtained by the image restoration process; and correcting a signal value of a specific pixel in the restored image, in a case that the calculated color difference of the specific pixel in the restored image is larger than the calculated color difference of the specific pixel in the input image, such that a difference between the calculated color difference of the specific pixel in the restored image and the calculated color difference of the specific pixel in the input image is reduced.

19. One or more non-transitory computer-readable storage media according to claim 18, wherein, in the case that the calculated color difference of the specific pixel in the restored image is larger than the calculated color difference of the specific pixel in the input image, the signal value of the specific pixel in the restored image is corrected to a signal value of the specific pixel in the input image.

20. One or more non-transitory computer-readable storage media according to claim 18, wherein the color difference is a difference between a signal value of a first color component and a signal value of a second color component.

21. One or more non-transitory computer-readable storage media according to claim 18, wherein the color difference is a ratio between a signal value of a first color component and a signal value of a second color component.

22. One or more non-transitory computer-readable storage media according to claim 18, wherein the image restoration filter is generated based on an optical transfer function of the optical system.

* * * * *